(12) United States Patent
Yang

(10) Patent No.: US 9,415,820 B2
(45) Date of Patent: Aug. 16, 2016

(54) TURN SIGNAL LAMP FOR BICYCLE

(71) Applicant: Kuo Chi Yang, New Taipei (TW)

(72) Inventor: Kuo Chi Yang, New Taipei (TW)

( * ) Notice: Subject to any disclaimer, the term of this patent is extended or adjusted under 35 U.S.C. 154(b) by 0 days.

(21) Appl. No.: 14/684,650

(22) Filed: Apr. 13, 2015

(65) Prior Publication Data

US 2015/0291240 A1 Oct. 15, 2015

(30) Foreign Application Priority Data

Apr. 15, 2014 (TW) .............................. 103113652 A

(51) Int. Cl.
*B62J 3/00* (2006.01)
*B62J 6/00* (2006.01)
(52) U.S. Cl.
CPC ....................................... *B62J 6/005* (2013.01)
(58) Field of Classification Search
CPC ....................................................... B62J 6/005
USPC ........................................ 340/432, 465, 475
See application file for complete search history.

(56) References Cited

U.S. PATENT DOCUMENTS

| 2013/0033370 A1* | 2/2013 | Langlois | B62J 6/005 340/432 |
| 2014/0043151 A1* | 2/2014 | Lin | B62J 6/005 340/432 |

* cited by examiner

*Primary Examiner* — Dhaval Patel
(74) *Attorney, Agent, or Firm* — Bacon & Thomas, PLLC

(57) ABSTRACT

The present invention is to provide a turn signal lamp for bicycle, which includes a casing having a front side made of transparent material, a circuit board disposed inside the casing, a battery electrically connected to the circuit board, a light indication switch disposed close to a handle of the bicycle and configured to generate an operation signal to the circuit board according to a user's operation, a light source plate disposed inside the casing and each having light units disposed thereon for receiving power and control signal from the circuit board and enabling the light units to emit light constantly or blinkingly, and at least one light guide plate disposed inside the casing and configured to form at least two surface lights from point lights emitted by the light units, so as to produce a light indication of turning right or left through the front side of the casing.

5 Claims, 6 Drawing Sheets

TURN SIGNAL LAMP FOR BICYCLE

FIELD OF THE INVENTION

The present invention generally relates to a turn signal lamp, more particularly to a turn signal lamp for a bicycle.

BACKGROUND OF THE INVENTION

In order to improve the safety for bicycle rider and reduce occurrence of the traffic accident, most bicycle manufacturers and designers make effort in equipping different types of safety devices on the bicycle. An existing turn signal lamp for bicycle in prior art is described as follows. Please refer to FIG. 1. The existing turn signal lamp includes a positioning member 11, a light emitting member 12 and a linking member 13. The positioning member 11 is disposed and positioned inside two open ends of the bicycle handle 2. The light emitting member 12 includes a base 120, a control member 121 (as dots regions shown in FIG. 1) linked to the base 120, a lighting driving circuit 122 filled in the base 120, a light unit 123 disposed on the lighting driving circuit 122, and a switch 124 disposed in the lighting driving circuit 122. The positioning member 11 and the light emitting member 12 are linked with each other via the linking member 13. When a user wants to turn and presses the control member 121, the control member 121 can enable the light emitting unit 123 on the lighting driving circuit 122 to generate a warning light, to provide a bicycle with a turn signal warning effect during riding.

Please refer back to FIG. 1. In the turn signal lamp, the positioning member 11 is placed into two ends of the bicycle handle 2. However, various designs of bicycles are existed on the market, and the bicycle handles 2 of different manufacturers are in different designs, so the turn signal lamp provider must produce various sizes of the positioning members 11 to be mounted into the handles 2 of the bicycles with various brand names. However, such turn signal lamp cannot meet the modern people's demand for simple and convenient use. In addition, the existing turn signal lamp is disposed at each of the two ends of the bicycle handle 2, so the turn signal lamp is easy to be hidden due to sight obscuration in some observation angles, and the reasons of occurring the sight obscuration includes a rider who has huge body, a blind spot from the vehicle behind, the goods hanged on the bicycle handle 2, or the like. The turn signal warning effect of the existing turn signal lamp may not be presented due to the factors described above, so the existing turn signal lamp is in lack of usefulness.

As the described above, in order to make bicycle rider feel safe and protect the right of bicycle rider, the turn signal lamp disposed on the bicycle is worth being improved. Therefore, it is a primary issue to develop a product to solve the defects of the existing turn signal lamp.

SUMMARY OF THE INVENTION

In order to solve the problem that the existing turn signal lamp for the bicycle disposed on the bicycle handle in general causes the driver in back of the bicycle hardly to see the turn signal lamp due to the sight obscuration in some observation view angles, and the problem of lack of safety, the inventors of the present invention provides a turn signal lamp for the bicycle which is expected to make user safer during riding, and the turn signal lamp can be applicable for various types of bicycles, so as to solve the foresaid problems.

An objective of the present invention is to provide a turn signal lamp for bicycle to display clearly a turning signal of the bicycle. The turn signal lamp includes a casing, a circuit board, a battery, a light indication switch, a light source plate, and at least one light guide plate. The casing is formed by assembly of a front cover and a back cover, and is provided with a closed accommodating space therein. The back cover can be assembled with the bicycle, and the front cover is made of transparent material. The circuit board is disposed in the accommodating space, and the battery may be disposed inside or outside the casing and electrically connected to the circuit board to supply power to the circuit board. The light indication switch is disposed close to a handle of the bicycle and electrically connected to the circuit board, and the light indication switch is configured to generate and transmit an operation signal to the circuit board according to a user's operation, to enable the circuit board to generate a control signal according to the operation signal. The light source plate is disposed inside the accommodating space of the casing and electrically connected to the circuit board to receive the power and the control signal from the circuit board. A plurality of light units such as LEDs or lamps, are disposed on the light source plate, and according to the control signal a part of the plurality of light units are controlled to emit light constantly and other part are controlled to blink, so as to form an indication of turning right or turning left. Each of the at least one light guide plates is disposed inside the casing, and a surface light can be formed by point lights emitted from the plurality of light units on the light source plate. Therefore, during riding bicycle, the user can operate the light indication switch prior to turning to enable the light source plate to generate the indication of turning right or turning left, so that a driver or a rider behind the bicycle can be noticed, and the safety of bicycle riding can be improved. In addition, the casing of the turn signal lamp of the present invention can be easily mounted in front or in the back of the bicycle by various assembly manners, so that the turn signal lamp of the present invention may be applicable for various types or various structures of bicycles, and usage convenience of the turn signal lamp can be improved.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Figure 1:
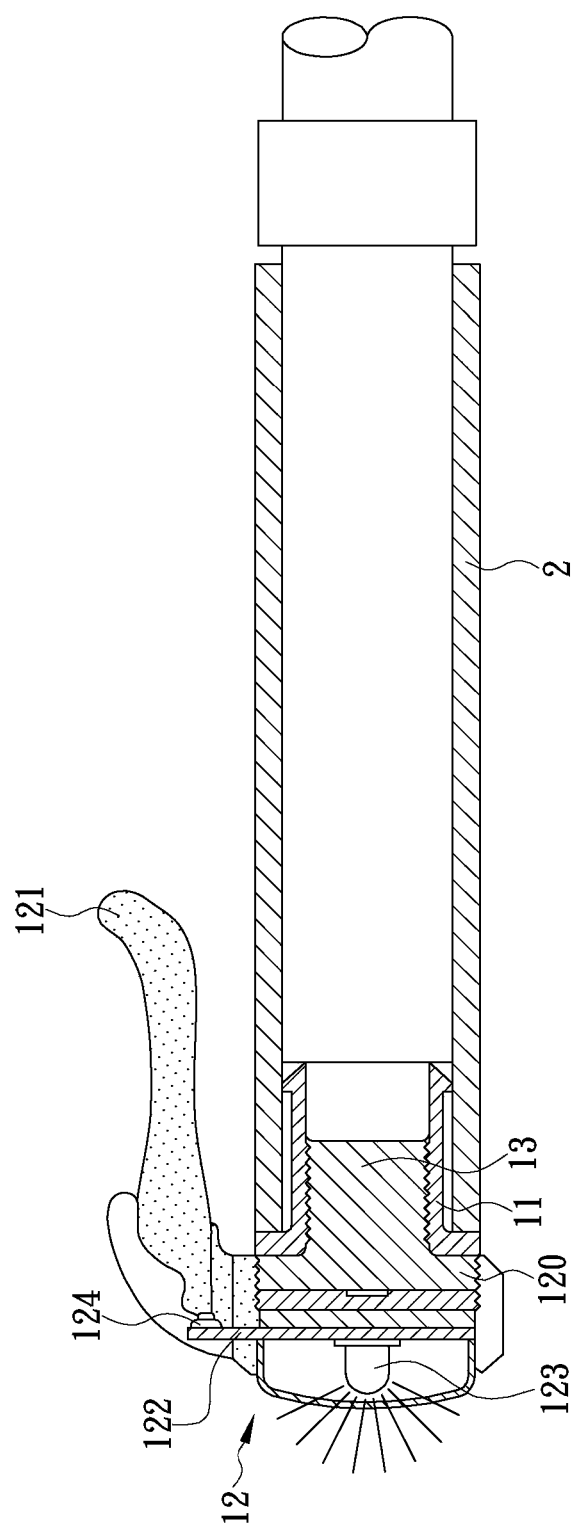
FIG. 1 is a schematic view of a traditional turn signal lamp.

Reference will now be made in detail to the exemplary embodiments of the present invention, examples of which are illustrated in the accompanying drawings. However, it should be understood that all the exemplary embodiments illustrated below are not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

The present invention illustrates a turn signal lamp which can be assembled with a front end or a back end of the bicycle to clearly display a turning signal of the bicycle to a driver in front or in the back of the bicycle. Please refer to FIG. 2. In an embodiment, a turn signal lamp 3 includes a casing 31, a circuit board 32, a battery 33, a light indication switch 34, a light source plate 35 and three light guide plates 36. It should be noted that the three light guide plate 36 in this embodiment are taken as an example for illustration, but in other embodiment of the present invention, one light guide plate 36 or at least two light guide plates 36 can be used upon demand.

Figure 2A:
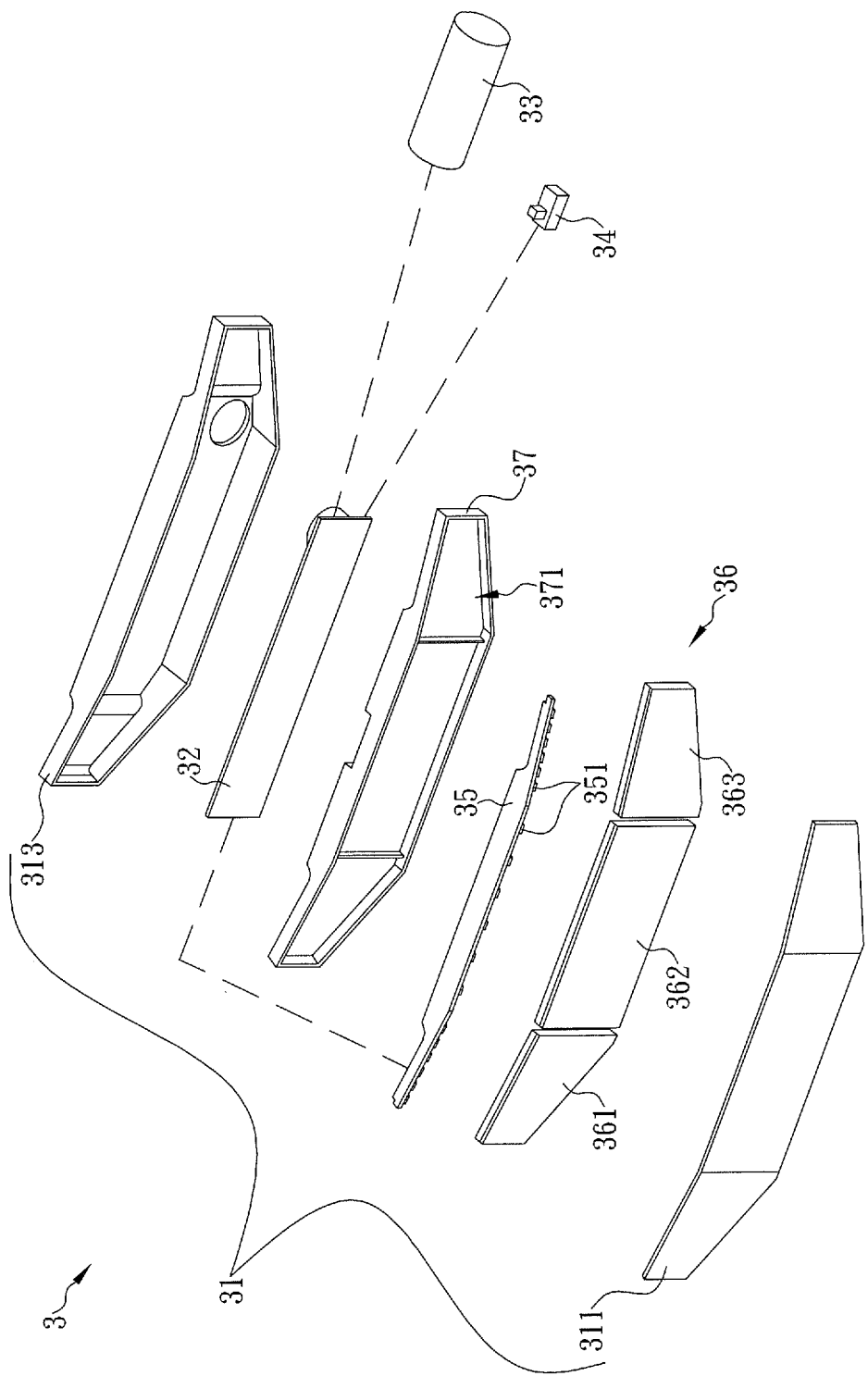
FIG. 2A is an embodiment of a turn signal lamp of the present invention.
Figure 2B:
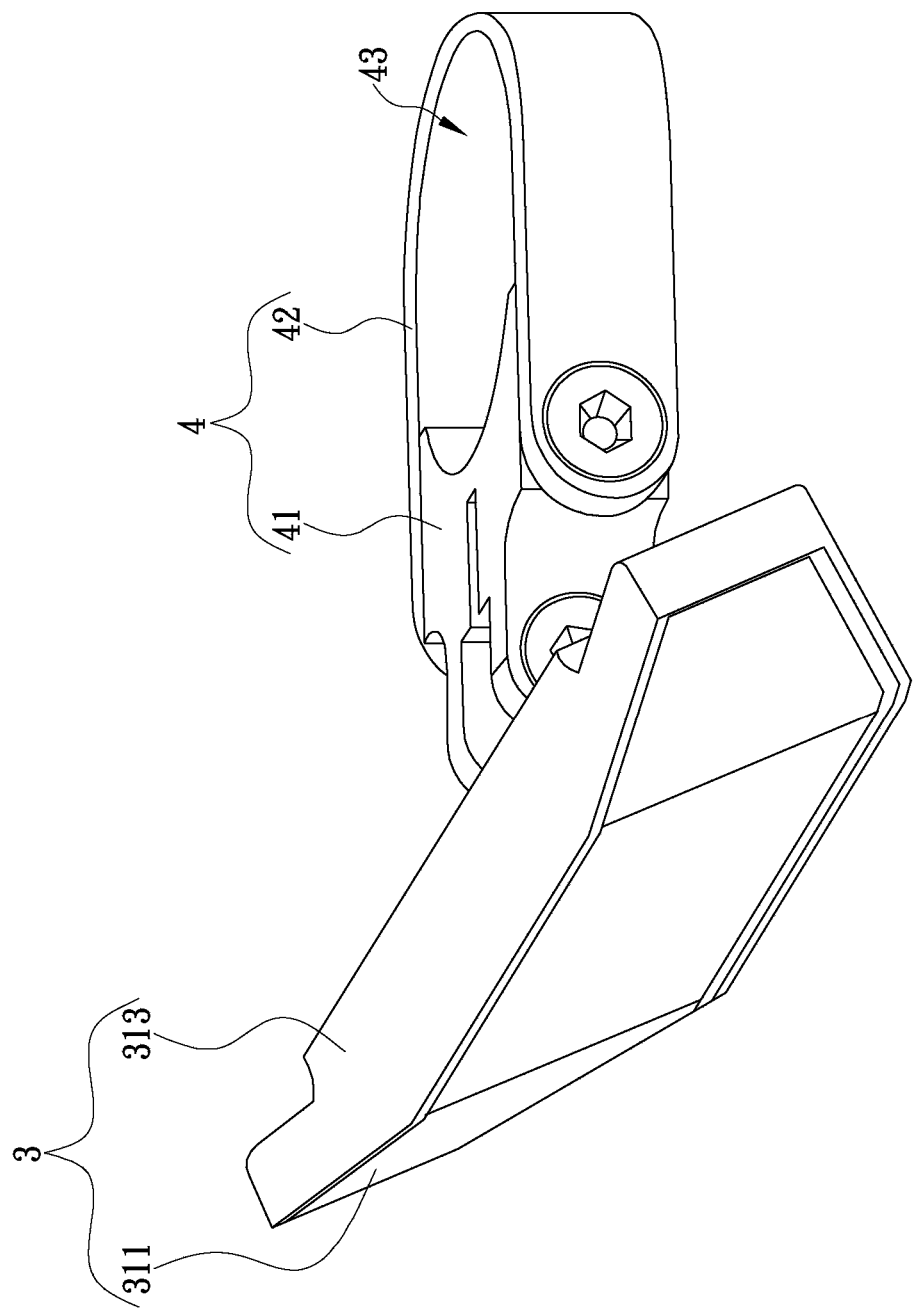
FIG. 2B is schematic view of the turn signal lamp having a clamping assembly of the present invention.

Please refer to FIG. 2A and FIG. 2B, the casing 31 is assembled with a front cover 311 and a back cover 313, and is provided with a closed accommodating space therein. In this embodiment, the back cover 313 is provided with a clamping assembly 4 disposed at a side thereof away from the front cover 311, and the clamp assembly 4 includes a first installation portion 41 and a second installation portion 42. The first installation portion 41 can be locked on the back cover 313 at an end thereof, and locked on the second installation portion 42 at other end thereof. A through hole 43 is formed between the first installation portion 41 and the second installation portion 42, and a rod of the bicycle can be passed through the through hole 43, so that the turn signal lamp 3 can be stably positioned on the bicycle. It should be noted that in other embodiments of the present invention the back cover 313 may be assembled on the bicycle by various manners of locking, fastening, wire twisting or etc., and the present invention is not limited to the clamping assembly 4 of the embodiments.

Please refer back to FIG. 2A. The front cover 311 is made of the transparent material, so the light generated inside the casing 31 may be transmitted to the outside of the casing 31. In addition, the circuit board 32 is disposed in the accommodating space, and the battery 33 is electrically connected to the circuit board 32, as the dashed line shown in FIG. 2A, to supply power to the circuit board 32 for normal operation.

Figure 3:
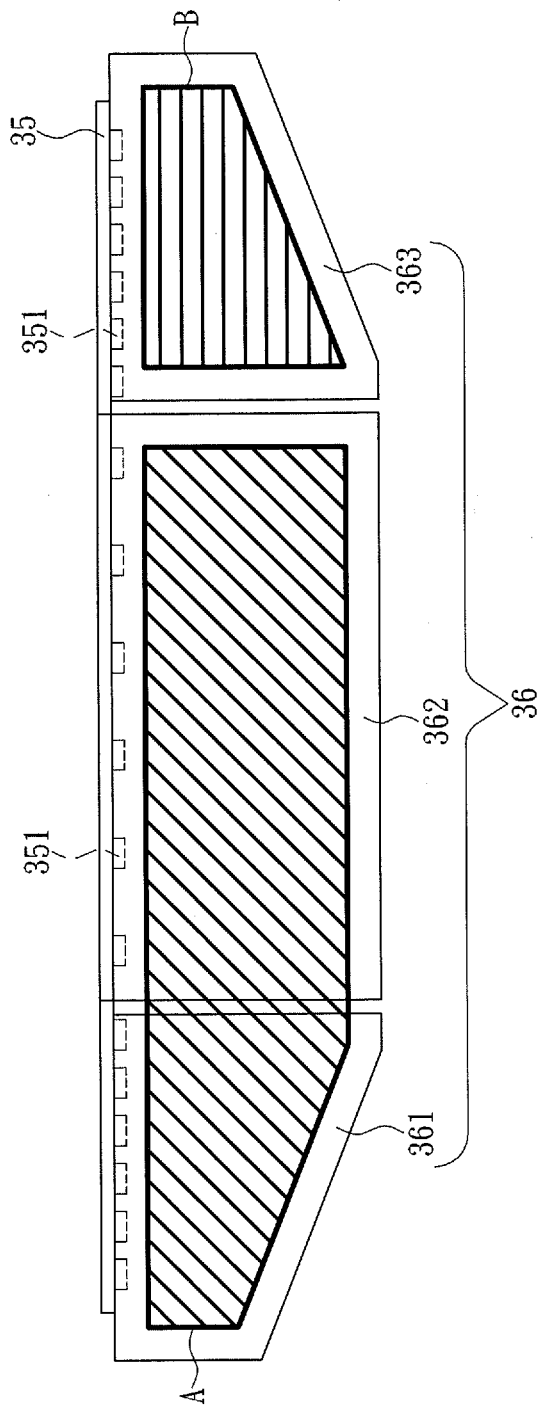
FIG. 3 is a front view of the turn signal lamp of the present invention.

Please refer back to FIG. 2A. The light indication switch 34 is disposed close to a handle of the bicycle (not shown in FIGs) and electrically connected to the circuit board 32 (as the dashed line shown in FIG. 2A). The light indication switch 34 may have different types, such as a button, a deflector rod, etc. and is configured to generate an operation signal according to a user's operation such as an action of pulling or toggling, and the operation signal is transmitted to the circuit board 32. Upon receipt of the operation signal, the circuit board generates a control signal corresponding to the operation signal. For example, in a case that the light indication switch 34 is the deflector rod, when the user toggles the deflector rod to right, the first operation signal is generated and transmitted to the circuit board 32, the circuit board 32 then generates a turning right control signal upon receipt of the first operation signal. When the user toggles the deflector rod to left, the second operation signal is generated and transmitted to the circuit board 32, the circuit board 32 generate a turning left control signal upon receipt of the second operation signal. The light source plate 35 is disposed inside the accommodating space of the casing 31 and electrically connected to the circuit board 32 (shown as dashed lines in FIG. 2A), to receive the power and the control signal from the circuit board 32. A plurality of light units 351 such as LEDs or lamps, are disposed on the light source plate 35 and can be controlled by the light source plate 35 to be a status of constantly emitting light, blinking, quenching or changing color. A part of a plurality of light units 351 can be at the status of emitting light constantly and other part of the plurality of light units 351 can be at the status of blinking. The light guide plates 36 are disposed inside the casing 31, include a left light guide plate 361, a middle light guide plate 362 and a right light guide plate 363, and are used to form at least two surface lights from point lights emitted from the light units 351 of the light source plate 35. A surface light emitting light constantly is formed in an area corresponding to the light units 351 which emit light constantly, and a blinking surface light is formed in an area corresponding to the light units 351 which blink. Please refer to FIG. 3. In the embodiment, when the circuit board 32 receives the control signal, the circuit board 32 can set the light units 351 corresponding to a surface light area A to be the state of emitting light constantly and the light units 351 corresponding to a surface light area B to be the state of blinking, so as to form the indication of turning right. Therefore, when the user is riding bicycle, the user can operate the light indication switch 34 prior to turning to enable the light source plate 35 to display the indication of turning right or turning left, such as when a turning right control signal is activated, the surface light region corresponding to the right light guide plate 363 blinks to generate a light indication of turning right, and the surface light region corresponding to the left light guide plate 361 and the middle light guide plate 362 emits light constantly to increase the contrast light area with respect to the light indication of turning right; on the contrary, when a turning left control signal is activated, the surface light region corresponding to the left light guide plate 361 blinks to generate a light indication of turning left, and the surface light region corresponding to the middle light guide plate 362 and the right light guide plate 363 emits light constantly to increase the contrast light area with respect to the light indication of turning left, so that the driver or rider in front or in the back of the bicycle can be noticed the turning signal of the bicycle, and the user's safety in riding bicycle can be improved.

In addition, please refer back to FIG. 2A and FIG. 3. Apart from aforesaid display effect, the indication of the turn signal lamp 3 may include a display effect of the surface light regions A and B emitting different colors, and the surface light regions A and B can emit constantly or blink. In addition, the emitting ratio or blinking rate of the surface light regions A and B can be changed, or areas of the surface light regions A and B may be different. Moreover, in order to stably position the light guide plate 36, a backlight support 37 may further be additionally disposed inside the case 31. The backlight support 37 is provided with an assembly space 371 concavely disposed at a side thereof, and the light source plate 35 may be assembled in the disposed space 371 and the light guide plates 36 are fastened in the backlight support 37, so that the light source plate 35 can be located between the backlight support 37 and the light guide plate 36. Therefore, the light emitting from the light units 351 of the light source plate 35 may be prevented from being dispersed, and the light can be transmitted to the light guide plate 36 to efficiently increase the light intensity of the turn signal lamp 3. Because the casing 31 can be easily assembled in front or in the back of the bicycle by various assembly manners, so that the turn signal lamp 3 of the present invention may be applicable for various types or various structures of bicycles, and the usage convenience of the turn signal lamp can be improved.

Figure 4:
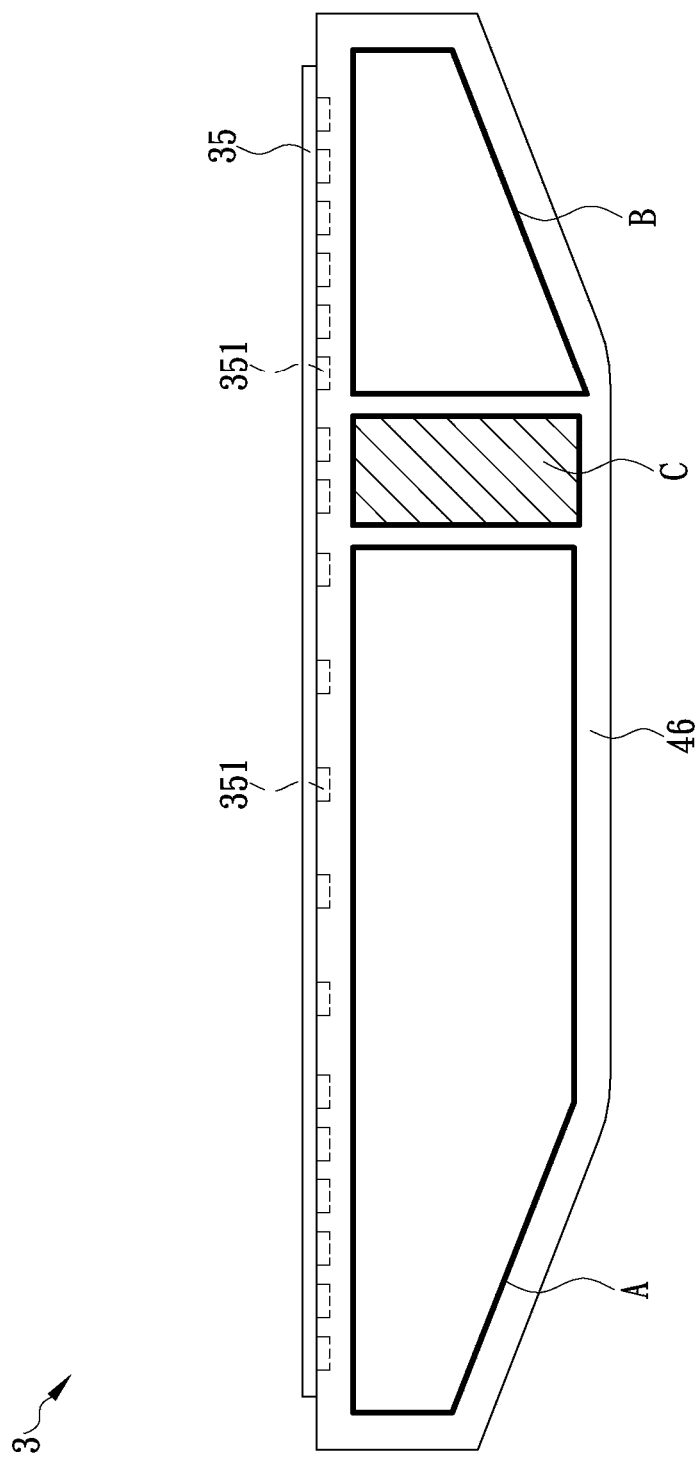
FIG. 4 is a schematic view of other embodiment of the turn signal lamp of the present invention.
Figure 5:
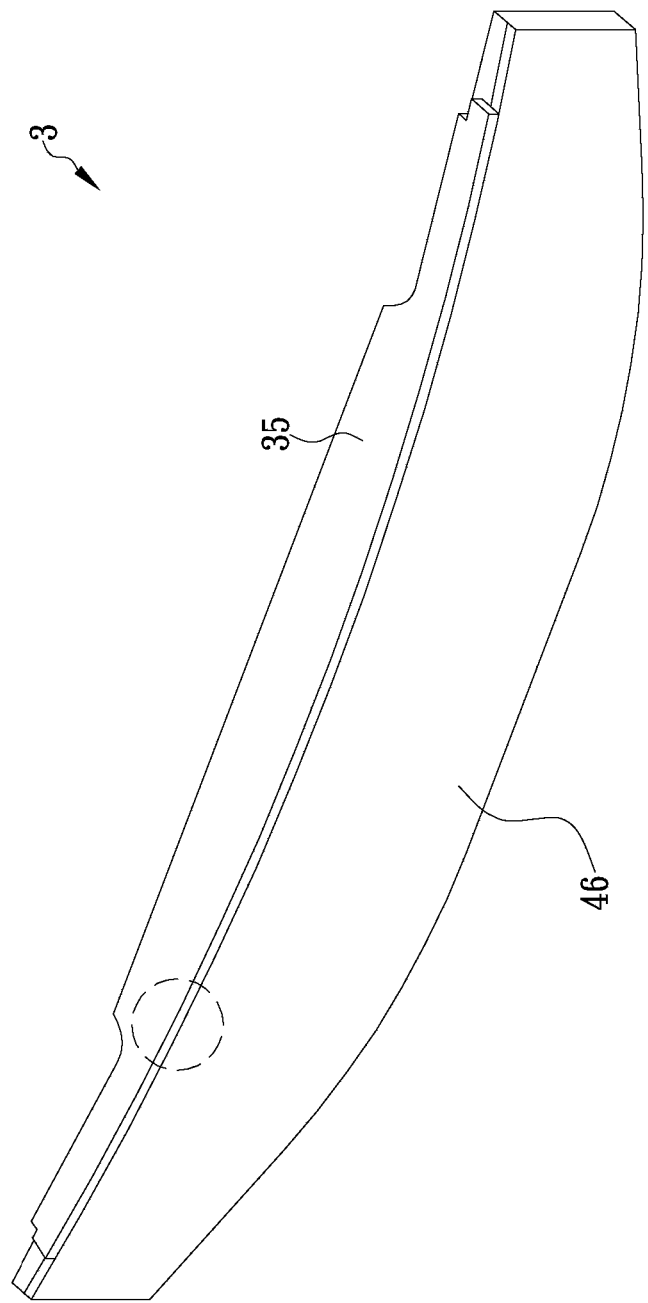
FIG. 5 is a perspective view of the other embodiment of the turn signal lamp of the present invention.

In addition, please refer to FIG. 4 which shows other embodiment of the present invention. The difference between this embodiment and the previous embodiment is that one light guide plate 46 is just used in this embodiment. Arrangements of other elements of this embodiment are that same as that of the previous embodiment. It should be noted that the numbers of the other elements is the same as that of the previous embodiments. In this embodiment, a dark area C is disposed between the surface light regions A and B, that is, the light units 351 corresponding to the dark area C is turned off, it means that the dark area C is lightless, to form a gap between the surface light regions A and B, so that the indication of turning generated by the turn signal lamp 3 can be displayed more clearly. Please refer to FIG. 5. In other embodiment, the light guide plate 46 can be in a bending arch shape as the dashed circle shown in FIG. 5, so that the appearance of the turn signal lamp 3 can be more beautiful, and the surface light can be formed more uniformly and completely. It should be noted that in the other embodiments of the present invention junctions of more light guide plates may be in arch shape to achieve the effect described above.

The above-mentioned descriptions represent merely the exemplary embodiment of the present invention, without any intention to limit the scope of the present invention thereto. Various equivalent changes, alternations or modifications based on the claims of present invention are all consequently viewed as being embraced by the scope of the present invention.

What is claimed is:

1. A turn signal lamp for bicycle, comprising:
   a casing, having an accommodating space therein, wherein a back side of the casing is assembled to the bicycle, and a front side of the casing is made of transparent material;
   a circuit board, disposed in the accommodating space;
   a battery, disposed inside or outside the casing and electrically connected to the circuit board for supplying power to the circuit board;
   a light indication switch, disposed close to a handle of the bicycle and electrically connected to the circuit board, wherein the light indication switch is configured to generate and transmit an operation signal to the circuit board for enabling the circuit board to generate a turning right control signal or a turning left control signal according to the operation signal;
   a light source plate, disposed inside the accommodating space of the casing and electrically connected to the circuit board for receiving the power and the control signal from the circuit board, wherein the light source plate comprises a plurality of light units, the plurality of light units are located at different positions on the light source plate respectively, and can be controlled to emit constant light, blink, quench or change color according to the control signal, so that a part of the plurality of light units can be set to blink according to the turning right control signal or the turning left control signal and the other part of the light units can be set to emit light constantly; and
   at least one light guide plate, disposed inside the casing and configured to transform point lights emitted by the light units of the light source plate into at least two surface lights and then form a plurality of surface light regions on the light guide plate according to the control signal, wherein areas of the surface light regions are different from each other and the point lights emitted by the light units are towards side edge of the light guide plate;
   whereby, one of the surface light regions blinks according to the turning right control signal or the turning left control signal, so as to generate a light indication of turning right or turning left, and the other surface light region emits light constantly.

2. The turn signal lamp of claim 1, wherein a dark area is formed between the two surface light regions, and the light units corresponding to the dark area do not emit light.

3. The turn signal lamp of claim 1, wherein light colors of the two surface light regions are different.

4. The turn signal lamp of claim 1, wherein the at least one light guide plate includes a left light guide plate, a middle light guide plate and a right light guide plate.

5. The turn signal lamp of claim 1, wherein at least one of the light guide plates is in a bending arch shape.

* * * * *